US012609331B2

(12) United States Patent
Ringk et al.

(10) Patent No.: US 12,609,331 B2
(45) Date of Patent: Apr. 21, 2026

(54) ELECTROCHEMICAL SYSTEM UNIT WITH SEALING ELEMENTS

(71) Applicant: Robert Bosch GmbH, Stuttgart (DE)

(72) Inventors: Andreas Ringk, Bamberg (DE); Anton Ringel, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 777 days.

(21) Appl. No.: 17/624,064

(22) PCT Filed: Jun. 12, 2020

(86) PCT No.: PCT/EP2020/066293
§ 371 (c)(1),
(2) Date: Dec. 30, 2021

(87) PCT Pub. No.: WO2021/001135
PCT Pub. Date: Jan. 7, 2021

(65) Prior Publication Data
US 2022/0359889 A1 Nov. 10, 2022

(30) Foreign Application Priority Data

Jul. 1, 2019 (DE) ..................... 10 2019 209 583.6

(51) Int. Cl.
*H01M 8/0273* (2016.01)
*H01M 8/0286* (2016.01)
*H01M 8/1004* (2016.01)

(52) U.S. Cl.
CPC ....... *H01M 8/0273* (2013.01); *H01M 8/0286* (2013.01); *H01M 8/1004* (2013.01)

(58) Field of Classification Search
None
See application file for complete search history.

(56) References Cited

U.S. PATENT DOCUMENTS

2002/0117780 A1* 8/2002 Inoue ............... B29C 45/14336
429/510
2003/0235744 A1 12/2003 Pflaesterer
2006/0068263 A1 3/2006 Kim et al.
(Continued)

FOREIGN PATENT DOCUMENTS

CN 103620090 A 3/2014
CN 204315668 U 5/2015
CN 110783598 A 2/2020
(Continued)

OTHER PUBLICATIONS

Translation of International Search Report for Application No. PCT/EP2020/066293 dated Sep. 8, 2020 (2 pages).

*Primary Examiner* — Jonathan G Leong
*Assistant Examiner* — Tony S Chuo
(74) *Attorney, Agent, or Firm* — Michael Best & Friedrich LLP

(57) ABSTRACT
The invention relates to an electrochemical system unit comprising a plurality of electrochemical cells that are arranged in layers side by side, each cell comprising an anode plate, a cathode plate and a sealing element, wherein the sealing element is designed to seal a space between the anode and cathode plate. Said system also comprises at least two electrochemical cells of the electrochemical system unit having different manufacturing types of the sealing elements.

7 Claims, 2 Drawing Sheets

(56) References Cited

U.S. PATENT DOCUMENTS

2012/0077110 A1    3/2012  Kim et al.

FOREIGN PATENT DOCUMENTS

| DE | 10160905 | A1 | 7/2003 |
|---|---|---|---|
| DE | 112006000501 | B4 | 5/2011 |
| JP | H11129396 | A | 5/1999 |
| JP | 2009281528 | A | 12/2009 |
| JP | 2012016877 | A | 1/2012 |
| JP | 2016009658 | A | 1/2016 |

* cited by examiner

ELECTROCHEMICAL SYSTEM UNIT WITH SEALING ELEMENTS

BACKGROUND OF THE INVENTION

The present invention relates to an electrochemical system unit for electrochemical cell stacks having sealing elements.

Electrochemical devices may have electrochemical cells for converting electrical energy into chemical energy or for converting chemical energy into electrical energy. Examples of electrochemical devices include polymer electrolyte membrane (PEM) fuel cells, solid oxide fuel cell (SOFC) fuel cells and general high-temperature or low-temperature fuel cells, and electrolyzers or redox flow batteries.

Fuel cells or batteries as examples of electrochemical devices are typically used as electrical current sources for supplying electric motors or machines, or for stationary decentralized energy systems. In this context, electric drives increasingly are constituent parts of a vehicle drive for electric bicycles, electric cars, hybrid vehicles and so on. Such systems promise an efficient energy supply and have advantages in relation to environmental protection.

Fuel cells convert chemical reaction partners, specifically fuels and oxidants, into reaction products within the scope of electrode reactions, with electrical energy being provided. Fuel cells generally use an electrolyte which is arranged between two electrodes, specifically a cathode and an anode. A catalyst typically promotes the desired electrochemical reactions at the electrodes.

Since individual fuel cells do not generate much energy and only generate a low voltage (e.g., approximately 0.7-0.9 volt), a plurality of fuel cells may be arranged together in a stack in order to generate sufficient electrical energy for the operation of motor vehicles or for generating electricity when stationary.

A fuel cell, for example a proton exchange membrane (PEM) fuel cell, normally contains a membrane electrode arrangement (MEA), which is formed by a catalyst-coated membrane arranged between a pair of gas diffusion layers. The catalyst-coated membrane itself usually has an electrolyte membrane arranged between a pair of catalyst layers.

SUMMARY OF THE INVENTION

Electrochemical cells are usually sealed by seals to prevent the escape of pressurized gases and liquids. To ensure that the pressurized gases and liquids do not circumvent the electrolyte membranes, the seals are generally formed around the edges of the electrochemical cells at the perimeter.

When fuel-cell stacks are sealed by means of sealing elements that bring about a sealing effect by way of a contact pressure, it is necessary to consider that the membrane electrode arrangement (MEA) arranged within an electrochemical cell contacts the anode and cathode layers through the respective electrolyte membranes in the case of compression that is too strong, leading to electrical short circuits. Accordingly, compression that is too weak may lead to a fuel cell not being sealed by means of the sealing elements.

A fuel-cell stack or stack of electrochemical cells is typically produced by repeated layer-like joining of several hundred fuel cells or electrochemical cells. Each of these electrochemical cells is provided with a seal in order to seal reaction gases and the cooling water from one another within the electrochemical cell.

Since several hundred electrochemical cells are stacked under a predetermined pressure load, each seal will remain in a compressed state over the service life of a stack of electrochemical cells or fuel cells for example for eighty thousand hours.

As a rule, a fuel-cell stack, or else a stack of electrochemical cells, will be operated under different conditions in relation to temperature, pressure and humidity, with each individual fuel cell having to ensure a tightness, especially in relation to the fuel gases and the corresponding oxidation gases, over the service life of a fuel-cell stack.

The present invention discloses an electrochemical system unit in accordance with the features of the independent claims. Advantageous configurations are the subject matter of the dependent claims and the following description.

The invention is based on the recognition that the use of identical sealing elements with production-related irregularities in certain portions of the sealing elements may be disadvantageous for the sealing effect since these correspondingly arranged irregularities of the sealing elements may interact in such a way that leaks arise.

Aspects of the present invention relate to an electrochemical system unit comprising a plurality of electrochemical cells arranged next to one another in layer-like fashion, each electrochemical cell having an anode plate, a cathode plate and a sealing element. In this case, the sealing element is configured to seal the space between the anode plate and cathode plate. In this electrochemical system unit, at least two electrochemical cells have different manufactured types of the sealing elements.

Such an electrochemical system unit can be used to convert electrical energy into chemical energy or chemical energy into electrical energy. Examples for such a conversion include a fuel cell, a redox flow cell or an electrolysis cell.

By means of such an electrochemical system unit, it is possible to construct a fuel-cell stack, for example. A plurality of electrochemical cells arranged next to one another in layer-like fashion may comprise a small number of cells, for example two or three cells, but the plurality may also comprise 100 cells, or even a much higher number of electrochemical cells may be arranged against one another, for example in order to form a fuel-cell stack.

When different manufactured types of sealing elements are used in the case of such a juxtaposition, these may interact in such a way that irregularities, which arise from the manufacture of the sealing elements, for example, either compensate one another or at least do not aggregate, for example in one portion of the sealing element. Such an aggregation would emerge if identically manufactured sealing elements of the individual fuel cells or electrochemical cells with irregularities at corresponding portions were strung together and had contact pressure applied thereto. Leaks may occur in the case of a juxtaposition of identically manufactured sealing elements with corresponding portions of irregularities.

Such irregularities may occur in different portions of the sealing elements and for example relate to a width of the seal, a compressibility, a hardness, a crosslinking density, a compression set or other properties, especially mechanical properties, of the sealing element in this portion.

In the various manufactured types of the sealing elements, the difference substantially relates to the manufacturing method of sealing elements with shapes that are as identical as possible in relation to the geometric and mechanical properties. However, depending on the manufacturing method, manufacturing-related local differences, that is to say differences in different portions of the sealing elements, are often unavoidable.

In particular, the number of different manufactured types may also be significantly greater than two, which lends itself to the situation where, in particular, for example the elasticity of a sealing element of an adjacent fuel cell is not sufficient to compensate a local inhomogeneity or irregularity but a plurality of sealing elements of adjacent fuel cells are required to compensate such an irregularity.

Moreover, the manufacturing-related irregularities may be arranged locally on portions of the sealing elements where an external force, for example in the form of a clamp of a fuel-cell stack, acts in order to reduce or prevent leaks on account of these local irregularities of the sealing elements. Since this pressure acts on the individual fuel cells there by means of end plates of the fuel-cell stack and the end plates are deformable, different mechanical pressures act over the different portions of the sealing elements.

The electrochemical cells arranged next to one another may have a membrane electrode arrangement where the actual electrochemical reaction takes place, between their cathode plate and the anode plate.

A sealing element may adopt different sealing tasks in different spatial regions between the cathode plate and the anode plate. Firstly, the sealing element can separate the cathode space from the anode space such that the fuel and the oxidant can only come together in the region of the catalyst. Secondly, the sealing element can serve to seal the respective reaction spaces of the cathode and of the anode in relation to a coolant circuit, or else can adopt further tasks for the gas distribution within the electrode spaces.

A further aspect proposes that the anode plate and the cathode plate of at least one electrochemical cell are each designed as a bipolar plate. In this case, the bipolar plate serves on the one side of an apposition of at least two electrochemical cells as an anode plate, for example, and on the other side as a cathode plate. Anodes or cathode plates designed thus may also relate to a plurality of the fuel cells, or else all fuel cells apart from the respective outer fuel cells, the end plates, may be designed as bipolar plates.

If the fuel cells or the electrochemical cells are designed with bipolar plates, the entire fuel-cell stack can be manufactured to be smaller while having the same number of fuel cells.

A further aspect proposes that the different manufactured types of the sealing elements are applied to an electrode plate of the electrochemical cells by means of an injection molding method or a dispensing method.

In the case of such an injection molding method for producing the sealing element, the respective anode plate or cathode plate is introduced into the injection mold such that, within the scope of manufacture, a very small variation in the thickness of the sealing element can be attained.

The advantage of the dispensing method is that the outlay for manufacturing a corresponding injection mold is dispensed with.

In this case, the sealing element can be applied to one of the two electrode plates, that is to say to the cathode plate or the anode plate, or else to both plates. In particular, the sealing element can be applied to both sides of an electrode plate.

By way of example, thermoplastics (PET, PP, PE, EPDM), thermoplastic elastomers (TPA-A, TPE-E, TPE-O, TPS, TPU, TPV), elastomers and thermosets (silicones, epoxides, urethanes, Viton, acrylates) can be used for the injection molding method for manufacturing the sealing elements.

By way of example, silicones, acrylates, epoxides, urethanes can be used for the dispensing method and corresponding materials can be used for the insertion.

An aspect proposes that the different manufactured types of the sealing elements are inserted into the electrochemical cells. Here, the different manufactured types of the sealing elements are manufactured outside of the electrochemical cell, that is to say without application to one of the two electrode plates, in various types and are then inserted between the electrode plates in order to seal the respective fuel cell in the assembled state of the fuel-cell stack.

A further aspect proposes that the different manufactured types of the sealing elements are molded on between the cathode plates and anode plates by means of an injection molding method or a dispensing method. Within the scope of this method, it is necessary to ensure that both electrodes of a fuel cell have a defined distance from one another while the sealing element is molded on. In this method, adhesion in relation to the two electrodes of the respective fuel cell may improve tightness.

An aspect proposes that the at least two different manufactured types of the sealing elements have a production-related irregularity in different portions of the sealing elements.

What this avoids is that irregularities of identical sealing elements, correspondingly arranged, facilitate interaction between the irregularities in such a way that a leak arises therefrom.

An aspect proposes that the sealing element has a production-related irregularity on an initial portion and/or a final portion from the manufacture of the respective sealing element. By way of example, in the case of a production method for the sealing element by means of an injection molding method, an injection point arises at the point where the material of the sealing element is pressed into the mold. Moreover, this point or this portion of the sealing element is exposed to a higher thermal load during the manufacturing method, possibly resulting in an inhomogeneous property of the material of the sealing element at this point. As a result of being able to identify this point, it is possible for example to vary the injection point, for example by way of appropriate injection molding tools, which either have different injection points or which allow the injection point to be varied by means of a so-called "moving insert". In the process, the sealing element may also be manufactured with a plurality of injection points since, in this case too, the injection points can be arranged in different portions of the sealing element. In this case, the plurality of injection points corresponds to a plurality of irregularities of the sealing element at a plurality of portions.

An aspect proposes that the different manufactured types of the sealing element have an initial portion and/or a final portion from the manufacture of the sealing element in different spatial regions of the sealing element.

By way of example, for dispensing the sealing element this means that for example the initial point and/or the final point for the application of the material of the sealing element is varied with respect to the spatial arrangement in relation to the sealing element so that different sealing elements arise in this way, said sealing elements being arranged offset from one another in the case of strung-together fuel cells for example, in order to ensure a better tightness.

An aspect proposes that the at least two different manufactured types of the sealing elements have the manufacturing-related irregularity, which is caused by at least two different positions of an injection point of an injection molding method in relation to a form of the sealing element, in different spatial regions of the sealing element.

A further aspect proposes that the at least two different manufactured types of the sealing element have the manufacturing-related irregularity, which is caused by at least two different positions of an initial point of a dispensing method in relation to a form of the sealing element, in different spatial regions of the sealing element.

An aspect proposes that the at least two different manufactured types of the sealing elements are arranged in the electrochemical system unit so as to interact in such a way that the production-related irregularities are compensated. What can be achieved in the process, for example by an offset arrangement with respect to the orientation in the stack of fuel cells, is that the seals of adjacently arranged fuel cells are able to compensate an inhomogeneity or irregularity of the adjacent seal, for example by way of an inherent elasticity, or that a corresponding arrangement of irregularities, resulting in these irregularities interacting such that a leak results, are prevented.

When using more than two different sealing elements which each have manufacturing-related irregularities at a different portion of the sealing element, a respectively suitable offset arrangement allows the effect of such irregularities to be distributed regularly over the portions of the sealing elements in order to minimize a negative influence on the tightness.

An aspect proposes that the at least two different manufactured types of the sealing elements in the electrochemical system unit are arranged within the electrochemical system unit in such a way that the manufacturing-related irregularities of the sealing elements are spatially offset from one another.

A further aspect proposes that the manufactured types of the sealing elements of at least two adjacent electrochemical cells in the system unit are selected such that the irregularities of the sealing elements do not correspond in space. This reduces an interaction of correspondingly arranged irregularities and leads to better tightness of the sealing elements.

An aspect proposes that, between an outer side of at least one first electrochemical cell and a second electrochemical cell adjacently arranged in the system unit, a sealing element is configured to seal the space between the two electrochemical cells using sealing elements according to the invention.

Thus, if no bipolar plate is used between the electrochemical cells, this interstice is typically used to cool the electrochemical cells. In this case, too, the tightness of this interstice can be improved by virtue of using the described sealing elements and by virtue of irregularities of the sealing elements likewise being arranged there in such a way that they do not correspond to sealing elements of other cooling interstices. In particular, an irregularity of the sealing elements of the cooling interstices can also be distributed over the portions of the sealing elements together with the irregularities of the sealing elements of the electrochemical cells such that, overall, an optimized tightness emerges.

A further aspect proposes that a membrane electrode arrangement is arranged in the space between the cathode plate and the anode plate of the electrochemical cell.

A further aspect proposes that two successive electrochemical cells have differently manufactured sealing elements.

A further aspect proposes that different sealing elements, in which the manufacturing-related irregularity is arranged in a different portion of the sealing element in each case, are manufactured in a number necessary to minimize, by way of the interaction of adjacently arranged electrochemical cells having such sealing elements, the effect on the tightness of the stack of electrochemical cells.

A further aspect proposes that the irregularities are distributed along the perimeter of the sealing element of an electrochemical cell in such a way that they are arranged below a clamp which brings about the contact pressure of the stack of electrochemical cells. That is to say, the irregularities can be reduced even further in relation to the influence on the tightness of the electrochemical cells by virtue of being arranged in a region with increased pressure.

A further aspect proposes that the irregularities are distributed on the perimeter of the sealing element of an electrochemical cell in a manner consummate to the number of different manufactured types of sealing elements.

A method for producing an electrochemical system unit as described above is proposed, wherein the at least two manufactured types of the sealing elements are caused by varying the initial point of the manufacture of the sealing elements.

Proposed is the use of an electrochemical system unit as described above for supplying energy to a mobile platform.

A mobile platform can be understood to mean an at least partly automated system which is mobile, and/or a driver assistance system. An example can be an at least partly automated vehicle or a vehicle with a driver assistance system. That is to say, in this context an at least partly automated system contains a mobile platform in relation to an at least partly automated functionality, but a mobile platform also contains vehicles and other mobile machines, including driver assistance systems. Further examples of mobile platforms can be driver assistance systems with a plurality of sensors, mobile multi-sensor robots such as, e.g., robotic vacuum cleaners or lawnmowers, a multi-sensor monitoring system, a manufacturing machine, a personal assistant or an access control system. Each of these systems can be a fully or partly automated system.

BRIEF DESCRIPTION OF THE DRAWINGS

Exemplary embodiments of the invention are illustrated in FIGS. 1 to 4 and are explained in more detail below and serve for better understanding of the invention.

In detail.

DETAILED DESCRIPTION

The same or similar components are labeled using the same or similar reference sign in the figures, with a repeated description of these components being dispensed with in individual cases.

Figure 1:
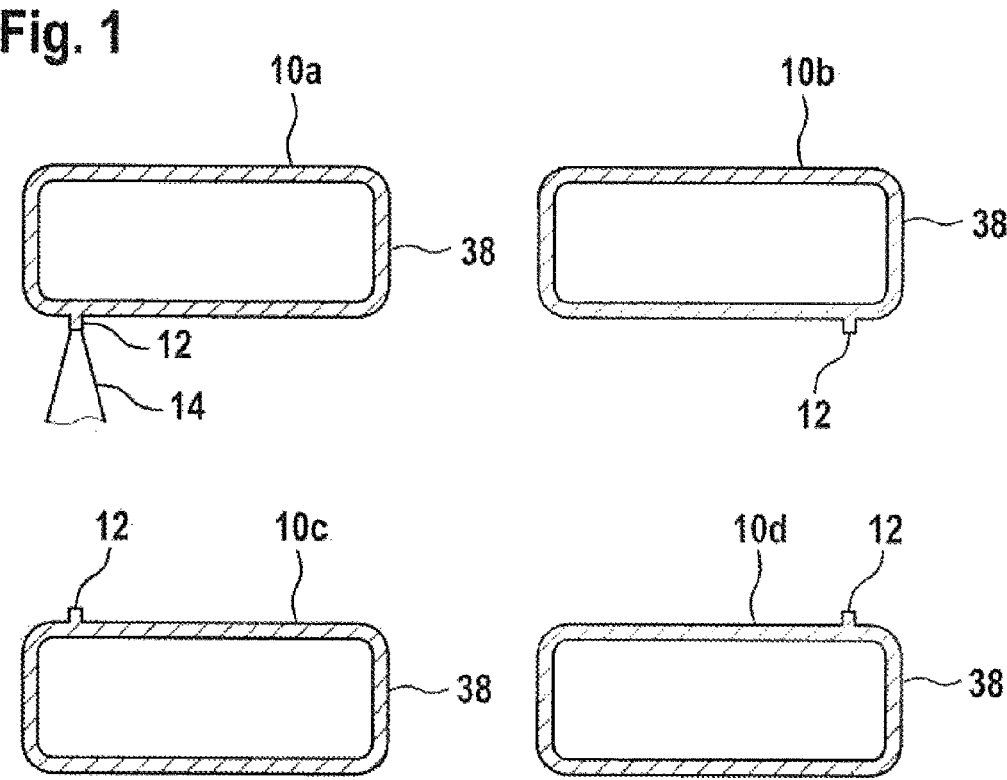
FIG. 1 shows sealing elements with different injection points.

FIG. 1 schematically shows four different manufactured types 10a to 10d of the sealing element 38, with the irregularity 12 of the sealing element 38 being present in the form of the injection points 12 in these examples, and these four different manufacturing types 10a to 10d of the sealing element 38 correspondingly having this irregularity at four different portions of the sealing element 38.

FIG. 1 sketches an injection nozzle 14 for the one manufactured type 10a of the sealing element 38, said injection nozzle being the cause of the injection point 12 when type 10a of the sealing element 38 is manufactured. In this case, the irregularity 12 of this manufactured type 10a of the sealing element 38 may go beyond the pure enlargement of the sealing area in this region and, for example, may be able to be traced back to a change in the material of the sealing element 10a, 38 on account of the greater heat influx at this point.

Figure 2:
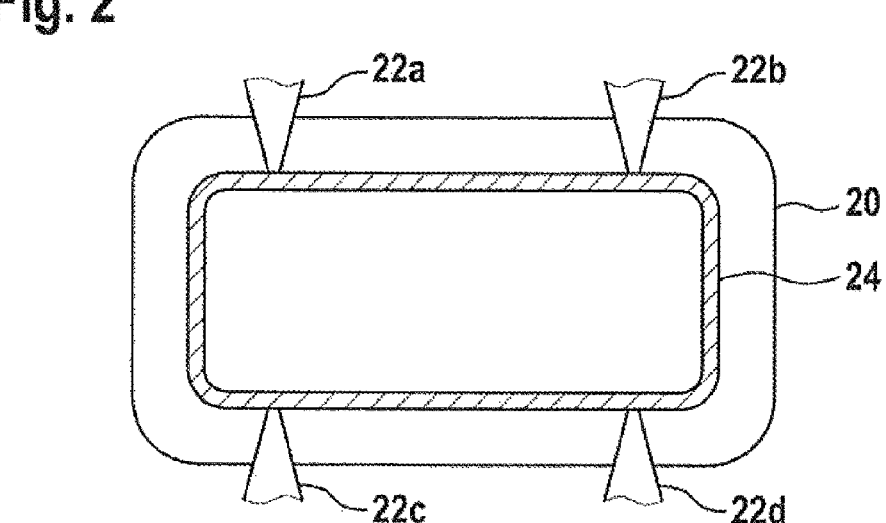
FIG. 2 shows an injection molding tool with different injection points.

FIG. 2 schematically shows an injection molding tool 20, provided in which is for example a depression 24 for the manufacture of a sealing element 38. To manufacture four different manufactured types 10a to 10d of the sealing elements 38, the injection molding tool 20 has four different injection nozzles 22a to 22d, for example. When such an injection molding tool 20 is used for the manufacture of different manufactured types 10a to 10d of sealing elements 38, it is also possible to use a greater number of injection nozzles 22a to 22d, which are arranged accordingly in different portions of the sealing element 38. In the example of the injection molding tool 20 of FIG. 2, it is possible for example, when using two of the injection nozzles 22a, 22b, 22c or 22d in each case, to accordingly manufacture two different manufactured types of sealing elements.

Figure 3:
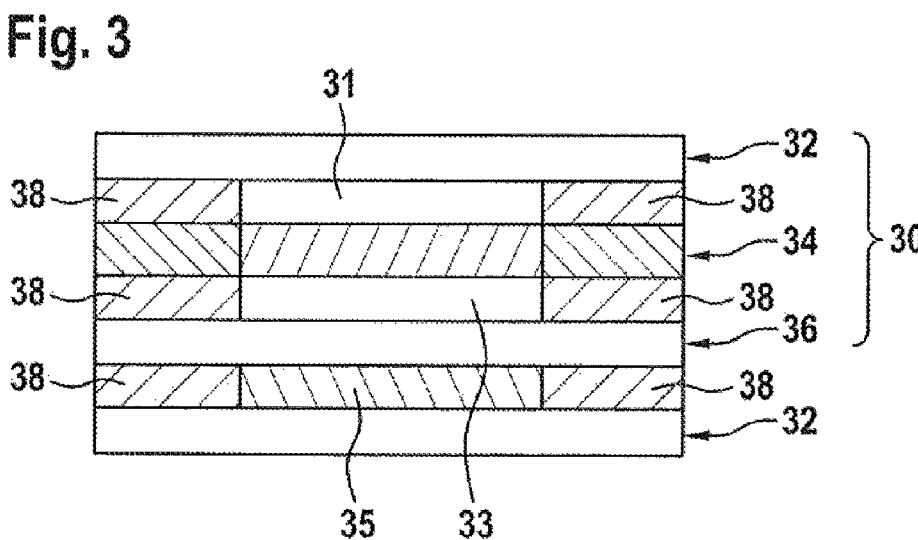
FIG. 3 shows a cross section through a fuel cell with an adjacent cooling space.

FIG. 3 schematically shows a cross section through an electrochemical cell 30 with an adjacent cooling space 35, comprising an anode plate 32, a cathode plate 36, a membrane electrode arrangement 34, an anode space 31, a cathode space 33 and sealing elements 38. As a result of an externally acting force, exerted by an assembled fuel-cell stack on the electrode plates 32, 36 of a fuel cell or electrochemical cell 30 constructed thus, the sealing elements 38 are brought into tight contact with both the membrane electrode arrangement 34 and a correspondingly opposing electrode 32, 36, as a result of which the sealing effect of the sealing element 38 arises.

Figure 4:
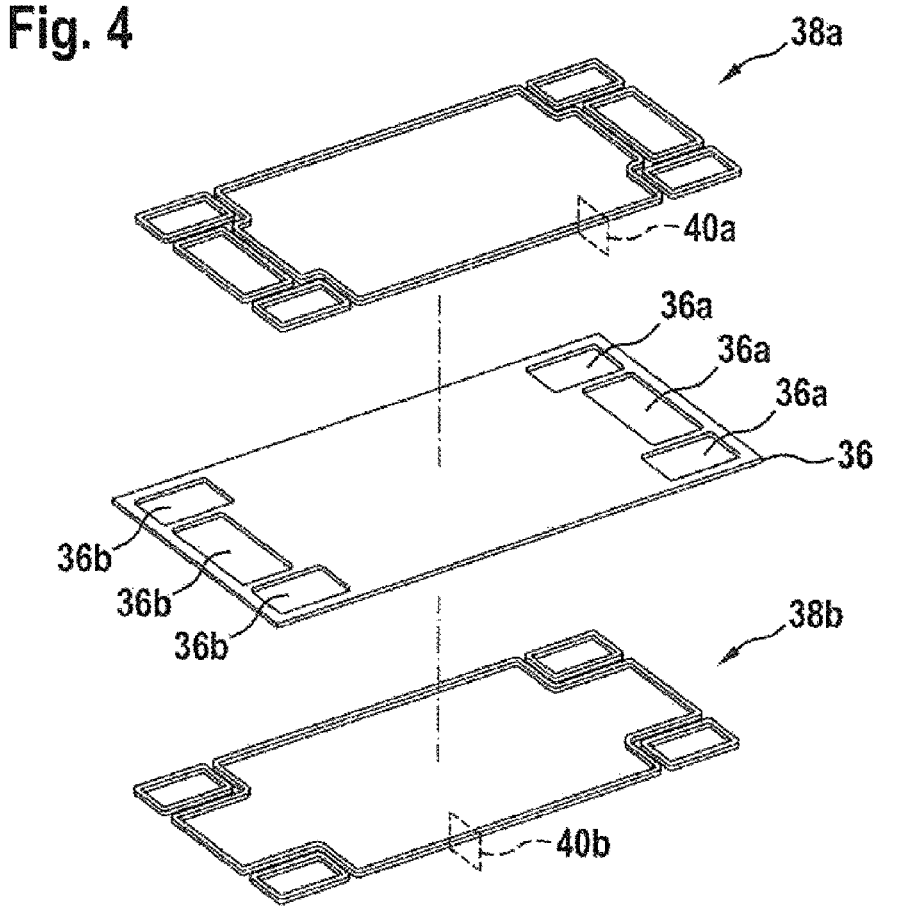
FIG. 4 shows an exploded view of an electrode of an electrochemical cell with sealing elements.

FIG. 4 schematically shows an electrode 36 of an electrochemical cell 30 which comprises perforations 36a, 36b at an upper and lower end of the electrode 32, 36, which perforations form channels for the supply and removal of fuel, oxidants and coolant in the case of a juxtaposition of electrochemical cells 30, and by means of which sealing elements 38a, 38b, which may be arranged both on an upper side and on a lower side of the electrode 32, 36, are separated from one another.

Two different manufactured types 38a, 38b of the sealing element 38 have been used in FIG. 4, said manufactured types having the manufacturing-related irregularity 40a and 40b, respectively, in corresponding different portions of the sealing elements 38a, 38b.

What is claimed is:

1. An electrochemical system unit comprising a plurality of electrochemical cells (30) arranged next to one another in layer-like fashion, each of the electrochemical cells having an anode plate (32), a cathode plate (36) and a sealing element (38), wherein the sealing element (38) is configured to seal a space between the anode plate (32) and the cathode plate (36); and at least two electrochemical cells (30) of the electrochemical system unit have different manufactured types (10a, 10b, 10c, 10b, 38a, 38b) of the sealing elements (38), wherein the different manufactured types (10a, 10b, 10c, 10d, 38a, 38b) of the sealing elements (38) are applied to an electrode plate (32, 36) of the electrochemical cells (30) by an injection molding method, wherein the different manufactured types (10a, 10b, 10c, 10d, 38a, 38b) of the sealing elements (38) have manufacturing-related irregularities (12, 40a, 40b) in different spatial regions of the sealing element (38) such that the manufacturing-related irregularities (12, 40a, 40b) are not aligned with one another in any section taken through the different sealing elements in a stacked direction of the sealing elements, wherein the manufacturing-related irregularities (12, 40a, 40b) are caused by at least two different positions of an injection point (12) of the injection molding method in relation to a form of the sealing element (38).

2. The electrochemical system unit as claimed in claim 1, wherein the anode plate (32) and the cathode plate (36) of at least one electrochemical cell (30) are each designed as a bipolar plate.

3. The electrochemical system unit as claimed in claim 1, wherein the different manufactured types (10a, 10b, 10c, 10d, 38a, 38b) of the sealing elements (38) were molded on between the cathode plates (36) and anode plates (32) by the injection molding method.

4. The electrochemical system unit as claimed in claim 1, wherein the different manufactured types (10a, 10b, 10c, 10d, 38a, 38b) of the sealing elements (38) are arranged in the electrochemical system unit so as to interact in such a way that the manufacturing-related irregularities (12, 40a, 40b) are compensated.

5. The electrochemical system unit as claimed in claim 1, wherein the different manufactured types (10a, 10b, 10c, 10d, 38a, 38b) of the sealing elements (38) are arranged in the electrochemical system unit in such a way that the manufacturing-related irregularities (12, 40a, 40b) of the sealing elements (38) are spatially offset from one another.

6. The electrochemical system unit as claimed in claim 1, wherein a membrane electrode unit (34) is arranged in the space between the cathode plate (36) and the anode plate (32) of the electrochemical cell (30).

7. A method for producing an electrochemical system unit as claimed in claim 1, wherein the different manufactured types (10a, 10b, 10c, 10d, 38a, 38b) of the sealing elements (38) are caused by varying an initial point (12, 40a, 40b) of the manufacture of the sealing elements (38).

* * * * *